United States Patent
Dreano et al.

(10) Patent No.: US 6,712,259 B1
(45) Date of Patent: Mar. 30, 2004

(54) METHOD FOR ASSEMBLING SHEET METALS AND RIGID STRUCTURE OBTAINED BY SAID METHOD

(75) Inventors: Claude Dreano, Mauron (FR); Loïc Jagorel, Mauron (FR)

(73) Assignee: Armor Inox (FR)

(*) Notice: Subject to any disclaimer, the term of this patent is extended or adjusted under 35 U.S.C. 154(b) by 0 days.

(21) Appl. No.: 09/913,782

(22) PCT Filed: Feb. 15, 2000

(86) PCT No.: PCT/FR00/00366
§ 371 (c)(1),
(2), (4) Date: Aug. 14, 2001

(87) PCT Pub. No.: WO00/48764
PCT Pub. Date: Aug. 24, 2000

(30) Foreign Application Priority Data

Feb. 16, 1999 (FR) .............................. 99 01839

(51) Int. Cl.⁷ ..................... B23K 9/235; B23K 31/00; B21D 39/00; B65D 1/34
(52) U.S. Cl. ..................... 228/135; 228/136; 228/174; 220/476; 220/573.1
(58) Field of Search ................. 228/174, 173.4, 228/135, 136; 219/10; 220/573.1, 476

(56) References Cited

U.S. PATENT DOCUMENTS

| | | | |
|---|---|---|---|
| 2,335,181 A | * 11/1943 | Heath | 219/10 |
| 2,630,175 A | 3/1953 | Dickerman | |
| 3,343,821 A | 9/1967 | Winn | |
| 4,276,242 A | 6/1981 | Chen | |
| 4,307,658 A | * 12/1981 | Kaebitzsch et al. | 403/322.1 |
| 4,501,949 A | * 2/1985 | Antol et al. | 219/121.63 |
| 4,637,133 A | * 1/1987 | Freeman | 29/282 |
| 4,669,530 A | * 6/1987 | Warner | 165/111 |
| 4,711,436 A | * 12/1987 | Kobuck et al. | 219/158 |
| 5,042,451 A | * 8/1991 | Beller | 126/25 A |
| 5,211,415 A | * 5/1993 | Gasiorowski | 228/173.4 |
| 5,249,818 A | * 10/1993 | Patterson | 228/135 |
| 5,316,165 A | * 5/1994 | Moran, Jr. | 220/62 |
| 5,601,736 A | * 2/1997 | Saitoh et al. | 219/121.64 |
| 5,711,210 A | * 1/1998 | Kaufman | 126/9 R |
| 5,878,940 A | * 3/1999 | Rosenbalm | 228/135 |
| 5,878,945 A | * 3/1999 | Weder | 229/117.01 |
| 6,016,634 A | * 1/2000 | Sayer | 52/648.1 |
| 6,051,817 A | * 4/2000 | Morsch et al. | 219/460.1 |
| 6,092,670 A | * 7/2000 | Marriott | 210/469 |
| 6,135,666 A | * 10/2000 | Kelly et al. | 403/13 |
| 6,280,349 B1 | * 8/2001 | Cook | 473/345 |
| 6,393,971 B1 | * 5/2002 | Hunot et al. | 228/135 |
| 6,401,959 B1 | * 6/2002 | Dreano | 220/476 |
| 6,415,947 B1 | * 7/2002 | Kim | 220/788 |

FOREIGN PATENT DOCUMENTS

| | | |
|---|---|---|
| FR | 1518878 | 7/1968 |
| FR | 2601653 A | 1/1988 |
| FR | 2669004 A | 5/1992 |
| GB | 926 407 A | 5/1963 |
| WO | WO9314893 | 8/1993 |

* cited by examiner

*Primary Examiner*—L. Edmondson
(74) *Attorney, Agent, or Firm*—Lackenbach Siegel LLP (57) ABSTRACT

A method for assembling a rigid industrial food-cooking container is disclosed wherein metal sheets respective recesses and projecting elements are first assembled and then shaped to a specific predetermined geometry for receiving the industrial food and the sheets temporarily connected and assembled at right angles, and welded or brazed to cover the entire contact surface between the sheets to provide a leak proof container for the industrial cooking of the food.

18 Claims, 9 Drawing Sheets

METHOD FOR ASSEMBLING SHEET METALS AND RIGID STRUCTURE OBTAINED BY SAID METHOD

The present invention mainly relates to a method for assembling sheet metals, preferably metallic sheets obtained by rolling, and to a rigid structure obtained by said method, such as an industrial cooking utensil.

It is normal to place hams to be cooked, wrapped or not in plastic bags, in stackable cooking utensils, comprising a plurality of parallel channels ensuring the holding of these hams during the cooking, to stack the utensils and to dispose the stack of utensils with hams to be cooked in a cooking unit into which a heat transfer fluid is made to enter. The channels, possibly associated with covers, confer the required shape on the hams.

These cooking utensils incorporate stainless steel sheets formed mechanically and assembled by welding. These sheets have to be positioned and kept in the required configuration during the operations of connecting them by welding. Thus these operations (positioning, holding and welding) are carried out manually, which increases the cost price of such a cooking utensil. In addition, any lack of precision in the positioning causes a variation in the geometry of the utensils, which become more difficult to stack.

Consequently one aim of the present invention is to obtain a method for producing a rigid structure produced mainly from sheet metals, notably a method for producing an industrial food cooking utensil or a component of such a cooking utensil, providing the immobilisation of the sheets to be assembled by welding and/or brazing before and during this welding and/or brazing step in a relative position corresponding to the relative positions of the said sheets after final connection by welding and/or brazing.

Another aim of the present invention is to offer such a method easy to implement and able to be executed by unskilled personnel.

Another aim of the present invention is to offer such an automatable and/or automated method. Notably, the forming such as cropping and folding is advantageously carried out automatically. Likewise, another aim of the present invention is to offer such a method providing automatic welding by a welding robot.

Another aim of the present invention is to offer a rigid structure of high precision, notably an industrial cooking utensil.

Another aim of the present invention is to offer identical assemblies with a rigid structure adapted to each other, notably stackable with very small dimensional variations from one structure to another, so as to facilitate the assembly thereof, notably the stacking.

These aims are achieved by a method according to the present invention including a step consisting in providing, in at least one sheet metal, a recess such as a notch, a cavity or, advantageously, an opening for receiving a projecting element on a second sheet metal with which the first sheet must be connected. Advantageously, the openings and the projecting elements are produced by cutting with a beam such as for example a plasma beam, or advantageously a laser beam, typically infrared, for example produced by a $CO_2$ laser. Advantageously, the cutting beam is guided automatically by a numeric-control automatic cutting apparatus.

Advantageously, the periphery of the sheet metal is also cut with the same beam, substantially simultaneously, that is to say during the same cutting operations as the cutting of the openings for receiving projecting elements. For elongate sheets, notably substantially rectangular ones having large sides and two small sides, the projecting elements are advantageously situated on the small sides. Advantageously, the sheet metal provided with projecting elements has a constant or substantially constant thickness, over its entire surface, including at the level of the projecting elements.

Advantageously, the projecting element or elements are disposed in line with the part of the sheet metal which carries them. Notably, for a flat sheet, the main faces of the projecting element are situated in two parallel planes defined by the main faces of the sheet.

The same sheet can include a projecting element for matching a second sheet and an opening for receiving a projecting element on a third sheet.

The welding can be carried out on all or some of the contact areas between the sheets and notably, but not necessarily, at the level of the projecting elements.

The assembly according to the present invention is particularly effective for perpendicular sheets.

The assembly according to the present invention, by the introduction of projecting elements into cavities or advantageously into openings, can also use walls provided with complementary notches also providing the assembly of various sheets. The nested elements can also be connected by welding and/or brazing.

An industrial cooking utensil according to the invention advantageously has parallel channels for receiving food, notably hams, and a rectangular peripheral frame typically composed of four sheets. The ends of the channels are provided with projecting elements whilst the sheets of the frame receiving the ends of the channels are provided with notches, or advantageously openings for receiving the said projecting elements. The projecting elements and their associated reception openings are disposed so that the nesting can take place only in the required relative positions of the channels with respect to the peripheral frame.

The object of the present invention is principally a method for assembling a rigid structure including at least a first sheet and a second sheet, characterised in that it includes the steps consisting in a) conferring the required shape on a first sheet and providing a recess for receiving a projecting element on a second sheet at the required contact location between the said recesses in the first sheet and a projecting element on the said second sheet;

b) conferring the required shape on a second sheet and providing a projecting element whose geometry is adapted to enter the recess in the first sheet, at the required contact location between the projecting element in the second sheet and the recess in the first sheet;

c) providing the temporary connection of the first sheet to the second sheet by nesting the projecting element on the second sheet in the recess in the first sheet;

d) providing the final connection of the first sheet and of the second sheet by welding or brazing in the same relative positions as those of the sheets achieved at step c).

Another object of the present invention is a method for assembling a rigid structure, characterised in that the two sheets are assembled at right angles.

Another object of the present invention is a method for assembling a rigid structure, characterised in that the recess is an opening passing through the first sheet from one side to the other.

Another object of the present invention is a method for assembling a rigid structure, characterised in that the length of the projecting element is less than the thickness of the first sheet.

Another object of the present invention is a method for assembling a rigid structure, characterised in that the second sheet is provided with a projecting element at a first end and with a second projecting element at a second end, each of the projecting elements being nested in a recess in two different first sheets.

Another object of the present invention is a method for assembling a rigid structure, characterised in that steps a) and b) are performed by cutting on a numeric-control cutting apparatus.

Another object of the present invention is a method for assembling a rigid structure, characterised in that the numeric-control cutting apparatus has a power laser.

Another object of the present invention is a method for assembling a rigid structure, characterised in that the second sheet has a plurality of projecting elements, in that step b) includes a sheet folding operation and in that, at step a), the recesses are produced in the first sheet corresponding to the position of these projecting elements on the second sheet after folding of this second sheet.

Another object of the present invention is a method for assembling a rigid structure, characterised in that the first sheet or its second sheet includes a notch for receiving a transverse sheet having a complementary notch.

Another object of the present invention is a method for assembling a rigid structure, the said structure having a rectangular peripheral frame, characterised in that it includes a step of connecting the sheets of the rectangular peripheral frame with internal sheets followed by a subsequent step of welding or brazing the ends of the sheets of the said frame.

Another object of the present invention is a method for assembling a rigid structure, characterised in that the welding or brazing for assembling the sheets is a welding by transparency effected from the face of the first sheet opposite to the one receiving the end of the first sheet.

Another object of the present invention is a method for assembling a rigid structure, characterised in that the welding or brazing carried out over the entire contact surface between the end of the second sheet and the first sheet.

Another object of the present invention is a structure produced by the method, characterised in that it includes at least two sheets assembled by welding or brazing, a first sheet having a recess containing a projecting element on the second sheet.

Another object of the present invention is a structure characterised in that the projecting element is a rectangular parallelepiped.

Another object of the present invention is a structure characterised in that the projecting element is disposed in line with the second sheet.

Another object of the present invention is a structure characterised in that the said structure is an industrial cooking utensil.

Another object of the present invention is a structure characterised in that the said structure is an industrial ham cooking utensil having a plurality of parallel channels, each channel being provided at each of its ends with at least one projecting element for connection with an end sheet.

The invention will be better understood by means of the following description and the accompanying figures, given as non-limitative examples, and in which:

In FIGS. 1 to 21, the same references have been used for designating the same elements.

Figure 1:
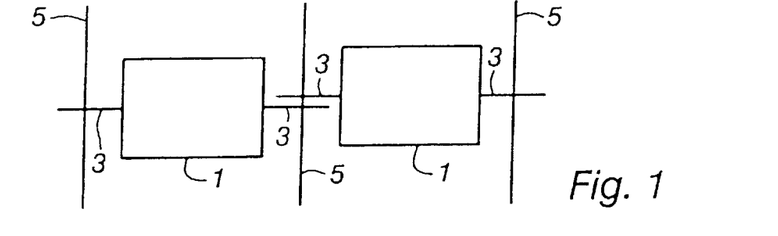
FIG. 1 is a perspective view of a first example embodiment of a structure according to the present invention using a projecting element cooperating with an opening passing through the thickness of a sheet.

In FIG. 1, a first sheet 1 can be seen, for example made from stainless steel, provided at one of its ends with a projecting element 3. In the preferred example illustrated, the projecting element is a rectangular parallelepiped having a length L and a height h1 and a thickness e2, advantageously equal to the thickness e1 of the sheet 1. The projecting element 3 is advantageously disposed in line with the end 5 of the sheet 1 which carries it. However, naturally it is understood that the use of the projecting element 3 having other forms such as for example pointed projecting elements, that is to say where the height, length and/or thickness reduces in moving away from the edge 5 going towards the end of the projecting element 3, does not depart from the scope of the present invention. Such projecting elements 3 are easier to centre. However, it is not easy to obtain a particularly precise positioning with such projecting elements.

A second sheet 7 with a thickness e3 is provided with an opening 9 for receiving projecting elements 3. In the advantageous example illustrated, the geometry of the opening 9 is complementary to that of the projecting element 3. The opening 9 has, for example, the shape of a rectangular parallelepiped. The width of the opening 9 is very slightly greater than the thickness e2 of the projecting element 3. The height h2 of the opening 9 is, advantageously, very slightly greater than the height h1 of the projecting element 3. Thus it is possible to insert the projecting element 3 into the opening 9, preferably by force. e2 is for example equal to 3 mm. h2−h1 is for example equal to 0.2 mm. In addition it is possible, without departing from the scope of the present invention, to cool the projecting element 3 and/or to heat the sheet 7 around the opening 9 in order to facilitate this insertion. Although the use of a projecting element 3 whose length L is greater than the thickness e3 of the sheet 7 does not depart from the scope of the present invention, it is advantageous to use projecting elements 3 whose lengths are equal to, or, preferably, less than the thickness e3 of the sheet 7. Thus the projecting element 3 does not project from the sheet 7, which can offer a substantially smooth surface. The projecting element 3 has sufficient rigidity to make it possible to support the sheet 1 which, after assembly, rests on the sheet 7.

Figure 2:
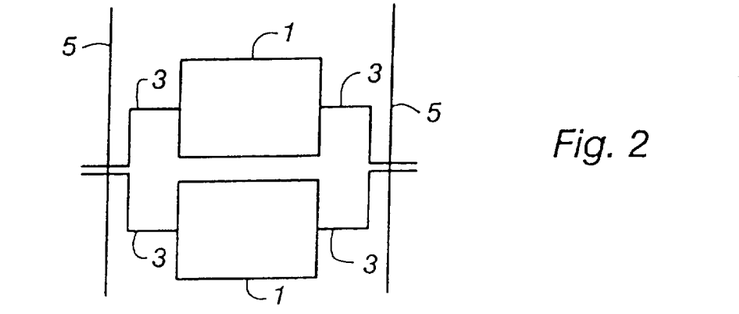
FIG. 2 is a plan view of the device of FIG. 1.
Figure 3:
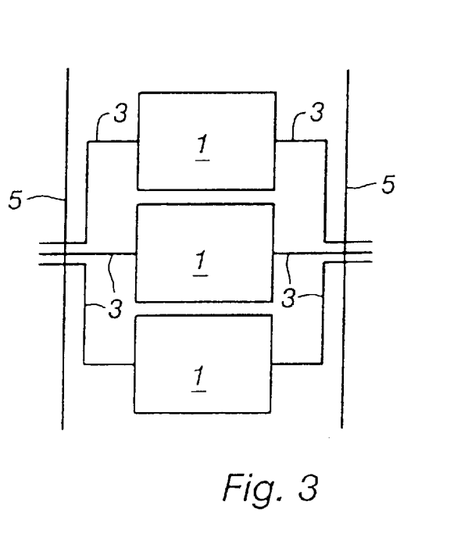
FIG. 3 is a front view of the structure of FIG. 1.

In the example illustrated in FIG. 2, the sheet 1 is provided with at least one projecting element 3 at each of its ends 5 allowing connection with a sheet 7 and a sheet 7' parallel to each other and perpendicular to the sheet 1.

The opening 9 and the projecting element 3 are disposed so as to allow the connection of the sheet 1 with respect to the sheet 7 and 7' in a required position, for example in order to produce a rigid structure such as an industrial food cooking utensil. When the projecting element 3 has entered the opening 9, the sheet 1 is connected with the sheet 7 or 7' by welding. Advantageously the welding takes place by transparency, that is to say from the outside in the direction of the arrows 11. The great precision of the positioning of the sheet 1 with respect to the sheet 7 allows transparency welding by laser in the direction of the arrows 11 from the outside, using for example a programmable automatic welding controller. The automatic controller sweeps all or some of the surface 11 corresponding to the contact area of the end 5 of the sheet 1 with the sheet 7. As a variant, if L<e3, the cavity formed by the external end of the opening 9 or by a notch 9' (FIG. 4) is filled with weld, this weld is raised to melting point in order to effect so-called "plugging" welding.

Figure 4:
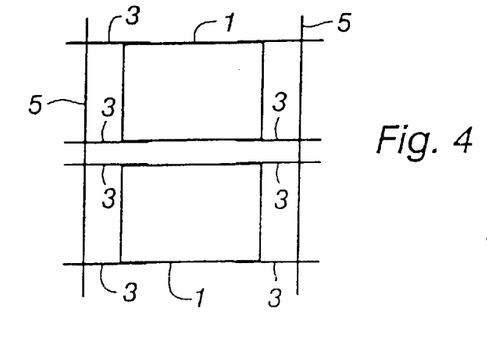
FIG. 4 is a perspective view of a second example embodiment of a structure according to the present invention using a projecting element cooperating with a notch opening out onto one of the ends of one of the sheets.
Figure 5:
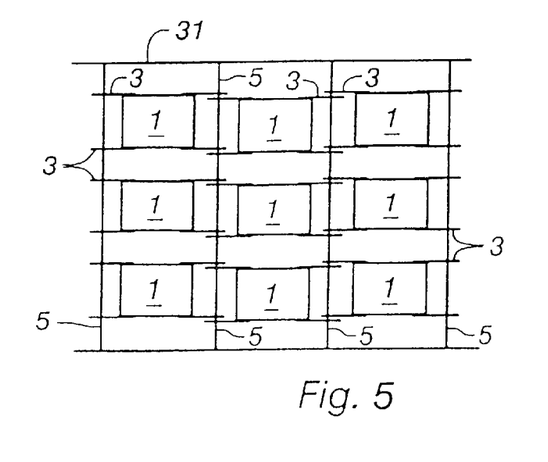
FIG. 5 is a view in section of a third example embodiment using a projecting element cooperating with a cavity of the blind hole type.

Naturally the present invention is not limited to the use of the sheet 7 having through openings 9 but extends to the sheets 7 having notches 9' as illustrated in FIG. 4 or blind holes 9" as illustrated in FIG. 5.

The notch 9' has the advantage of being able to insert the sheet 1 not only by its end but also from top to bottom. It has the drawback of not allowing a vertical positioning as precise as the solution in FIGS. 1 to 3. The length L of the projecting element 3 advantageously has a length less than or equal to the thickness of the sheet 7.

Figure 9:
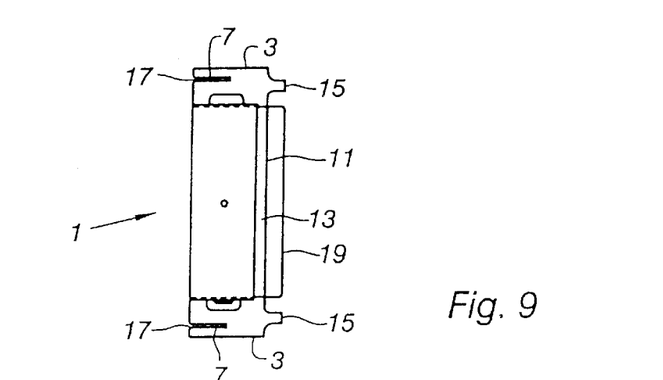
FIG. 9 is a view of one end of the channel in FIG. 8 after the folding has been carried out.

The use of a blind hole 9" as illustrated in FIG. 9 has the advantage of offering a face of the sheet 7 opposite to the sheet 1 which is perfectly smooth. It has the drawback of a machining of the blind hole 9" which may prove to be expensive. To permit contact between the end area 5 of the sheet 1 with the face of the sheet 7 having the opening 2", the length L of the projecting element 3 is slightly less than or equal to the depth P of the blind hole 9".

Figure 6:
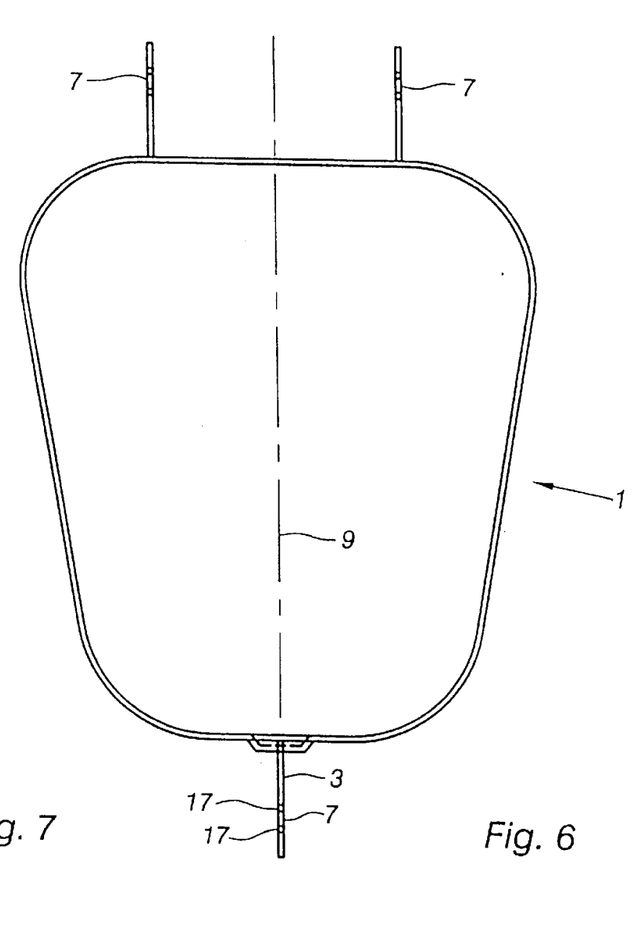
FIG. 6 is a perspective view of an embodiment of the first example of a structure according to the present invention.
Figure 21:
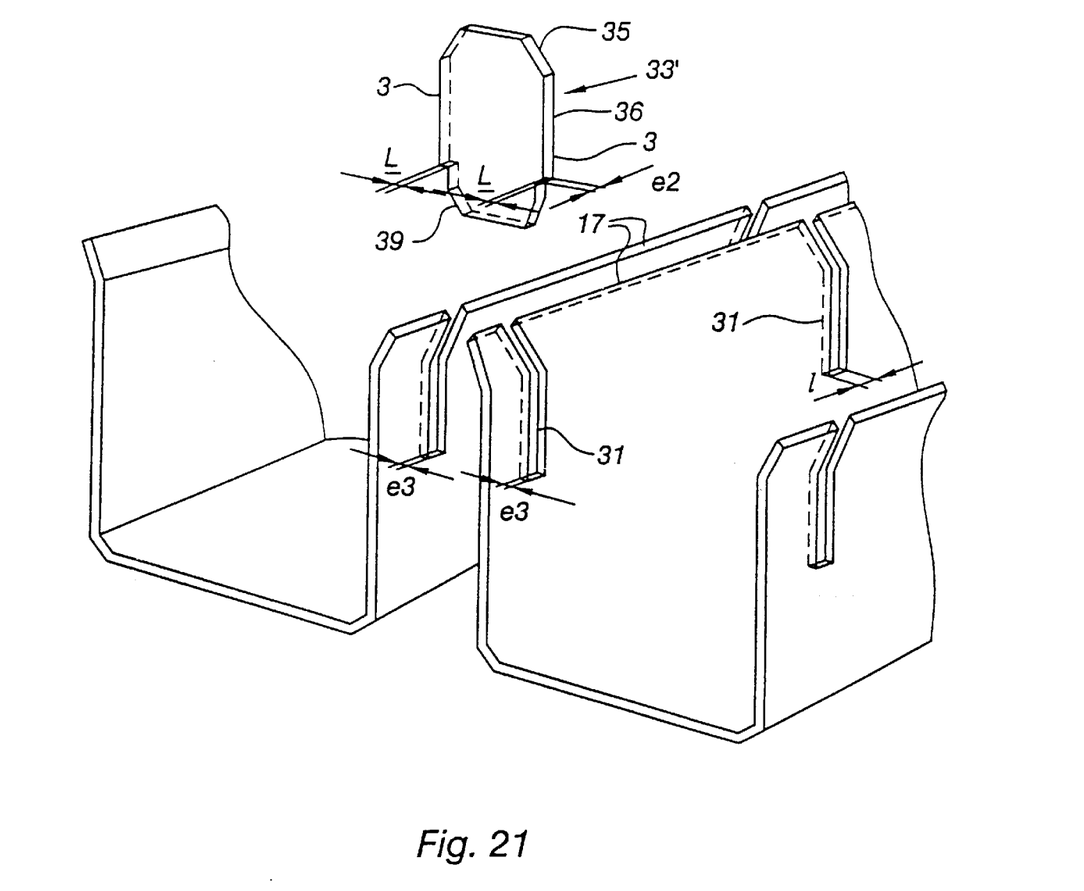
FIG. 21 is a perspective view of a detail of a variant embodiment of the preferred example embodiment of an industrial cooking utensil according to the invention.

FIG. 6 shows schematically an industrial cooking tool, notably for hams, having an advantageously rectangular peripheral frame composed of two end sheets 15 of the channels 17 parallel to each other and two sheets 19 perpendicular to the sheets 15. The sheet 15 has openings 19 for receiving projecting elements 3 disposed at the ends of the channels 17 whilst, advantageously, the sheet 19 has openings 9 for receiving projecting elements 3 on the transverse plates 21 such as partitions dividing the channels 17 into several sections of shorter length. In a variant, the transverse plates 21 are disposed under the channels so as to allow cooking of bar hams whose length is equal to that of a channel. However, industrial cooking utensils with no transverse plates 21, as illustrated in FIG. 21, will not depart from the scope of the present invention.

The assembly of the industrial cooking utensil of FIG. 6 is effected advantageously in the following manner:

First of all, all the channels (for example 8 in number) of the cooking utensil are disposed in parallel. Any transverse plates 21 are disposed on the set of parallel channels. If necessary, a mallet or the like is used for making the transverse walls 21 enter the channels.

The sheets 15 are applied at the ends of the channels 17, making the projecting elements 3 enter the openings 9 in the sheets 15, with a mallet if necessary. The sheets 19 are applied to the ends of the transverse plates 21, whose elements 3 are made to enter the openings 9 in the sheet 19. The welding or brazing of the ends 5 of channels 17 on the end sheet 15 and the ends of transverse plates 21 on the end sheet 19 is carried out, advantageously with a numeric-control automatic welding robot. It should be noted that the insertion of the projecting elements 3 into the openings 9 affords a precise positioning of the channel ends. Thus, in order to provide the assembly operation, it suffices to program the path of the welding or brazing tool of the welding robot corresponding to the position of the contact surface between the end of the channel 17 and the sheet 15 or between the end of the transverse plate 21 and the sheet 19. The ends of the sheets 15 are welded with those of the sheets 19. The various items of equipment (not shown) such as legs, handling grips, covers and the like are connected.

Figure 7:
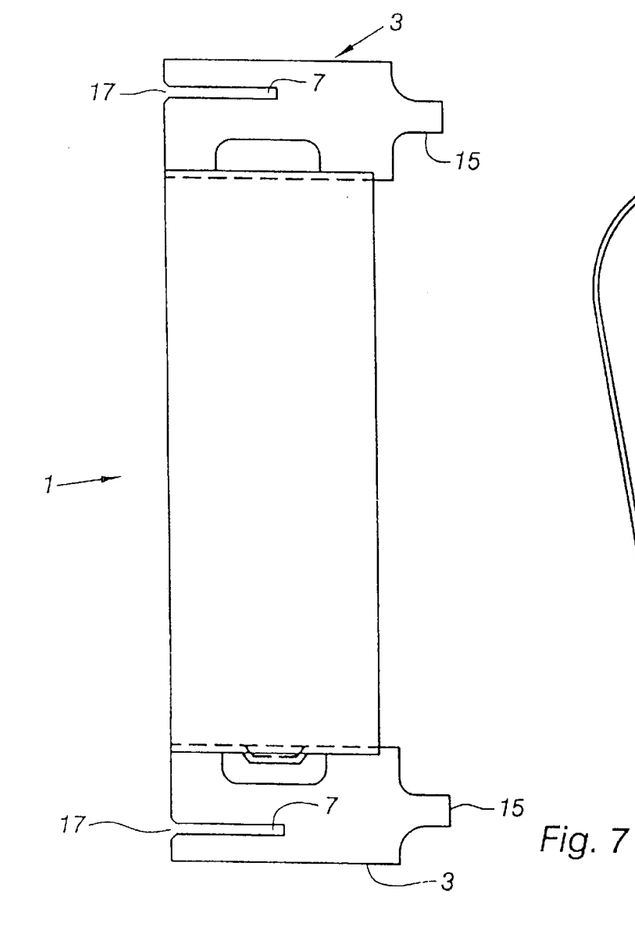
FIG. 7 is a perspective view of an embodiment of the second example of a structure according to the present invention.

In FIG. 7 a schematic representation of an industrial cooking element can be seen which differs from the utensil of FIG. 6 in that the end sheets 15 and 19 are provided with notches 9' opening out, in the non-limitative example illustrated, on the top face of the frame formed by these sheets. The industrial cooking utensil of FIG. 7 can be assembled in a manner similar to that of FIG. 6. In a variant, a peripheral frame is produced first of all by welding the ends of the sheets 15 and 19, advantageously provided with complementary projecting elements 23. In addition, these channels 17 are assembled by nesting with the transverse plates 21 and then this assembly is inserted, from the top, into the peripheral frame.

The cuts in the sheets in FIG. 8 to 17 are for example made by means of a $CO_2$ or nitrogen laser cutting robot.

The welds are carried out by means of a welding robot.

The sheets used for producing the industrial cooking element according to the present invention are for example sheets of AISI 304 or AISI 304L stainless steel.

Figure 8:
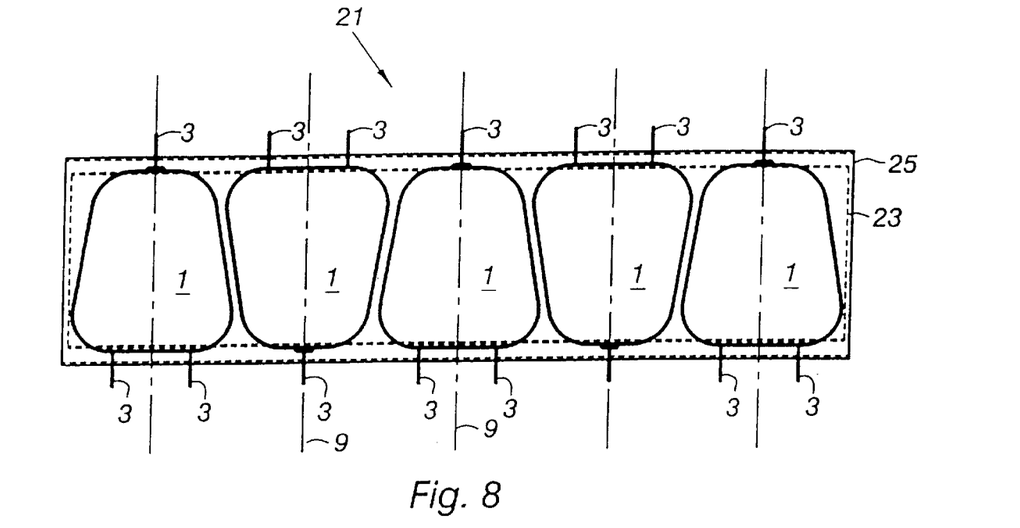
FIG. 8 is a flat view of a channel sheet able to be used for producing the structure of FIG. 6.

In FIGS. 8 and 9, the preferred embodiment of a channel with a square cross-section can be seen, able to be used with an industrial ham cooking utensil according to the present invention.

The channel 17 of the example illustrated is a channel with a substantially rectangular cross-section having a horizontal flat bottom 25 in the condition of use, panels 27 perpendicular with respect to the bottom 25 and a splayed opening 29 for loading the hams. Each end 5 of a channel carries at least one, and preferably two or more, projecting elements 3. In the advantageous example illustrated, each end 5 of a panel 27 carries a projecting element 3 which is rectangular (seen in plan). The channel 17 can have pairs of notches 31 disposed facing each other on the panels 27 for receiving transverse plates 21, notably partitions delimiting compartments for receiving hams. In the non-limitative example illustrated, the channel 17 has pairs of notches 31, it being understood that a lesser number of notches 31, and consequently of partitions 21, makes it possible to cook longer hams.

The channel 17 has a certain degree of transverse elasticity making it possible, when projecting elements 3 are inserted in the openings 9, to vary the distance between the panels 27 until the required geometry is obtained. A gripping of the panels 27 is illustrated in dotted lines in FIG. 9.

Figure 10:
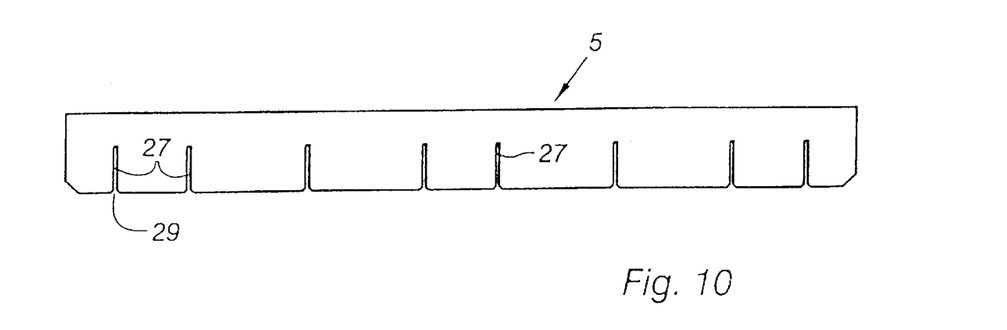
FIG. 10 is an elevation view of a sheet for holding the channels of an external frame of the structure of FIG. 6.

In FIG. 10, a rectangular sheet 15 can be seen, having openings 9 for receiving projecting elements 3 of a plurality of channels 17 in FIGS. 8 and 9. Advantageously, all the openings 9 are aligned. Two openings 9 corresponding to the same channel are apart by a distance corresponding to the width of the channel whilst two openings 9 corresponding to two consecutive channels have sufficient distance to form between these channels a shaft for the circulation of the heat transfer fluid so as to assist the homogenisation of the temperature during cooking.

Figure 11:
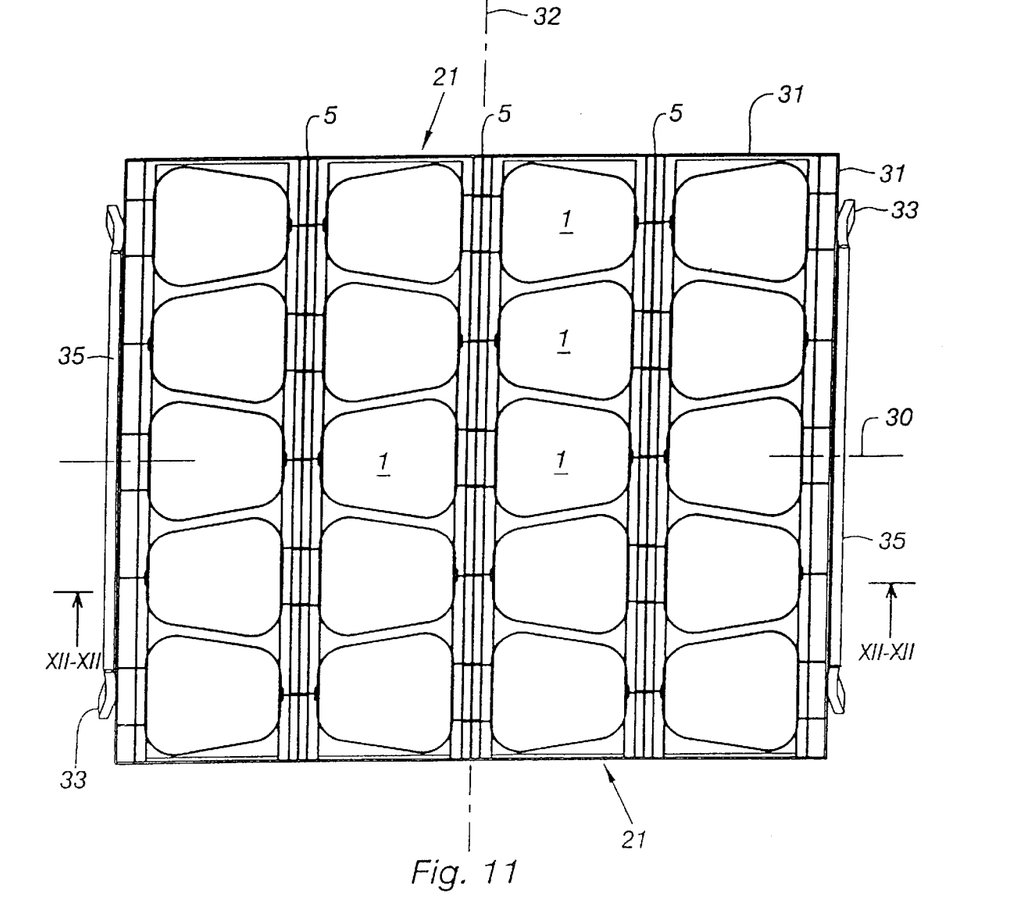
FIG. 11 is an elevation view of a sheet for holding the transverse partitions of a peripheral frame of the structure of FIG. 6.

In FIG. 11, a rectangular plate 19 can be seen, having openings 9 for receiving projecting elements 3 of transverse partitions 21.

Figure 12:
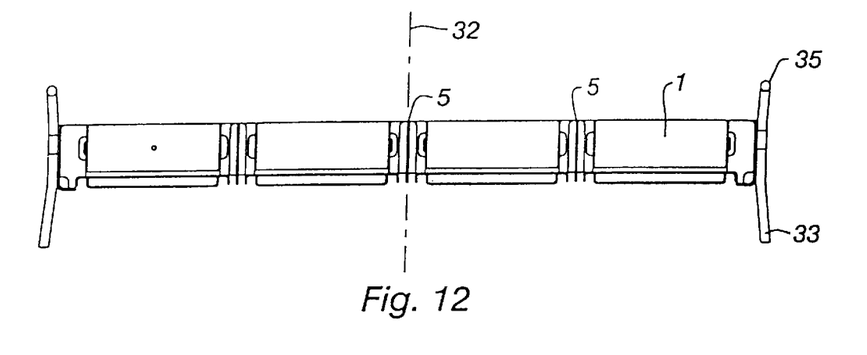
FIG. 12 is an elevation view of a partition of the structure of FIG. 6.

In FIG. 12, a transverse partition 21 can be seen, having a succession of rectangular elements 32 entering the channels 17 separated by intermediate elements 33. The top part of an intermediate element 33 has ramps 35 supporting the splayed part 29 of the channels. The bottom part of an intermediate element 33 has two notches 37 able to nest in the notches 31 in two successive channels. Advantageously, the inclined ramps 35 lead to the notches 37 facilitating nesting. Each end 41 of a transverse partition 21 has a projecting element 3 able to nest in an opening 9 in a plate 19 in this FIG. 11.

Figure 13:
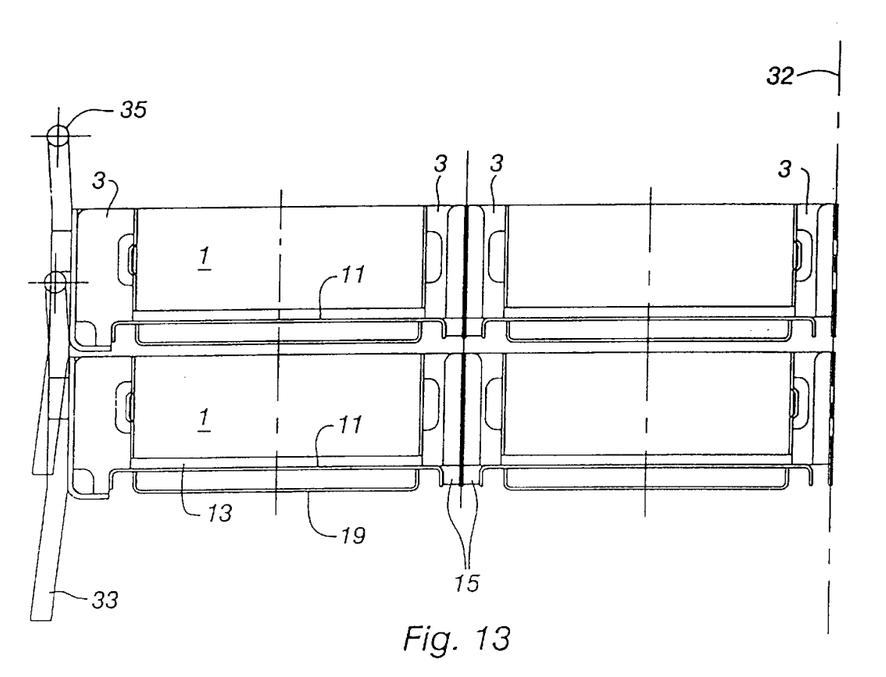
FIG. 13 is a view flat of a channel sheet able to be used for producing the structure of FIG. 7.
Figure 14:
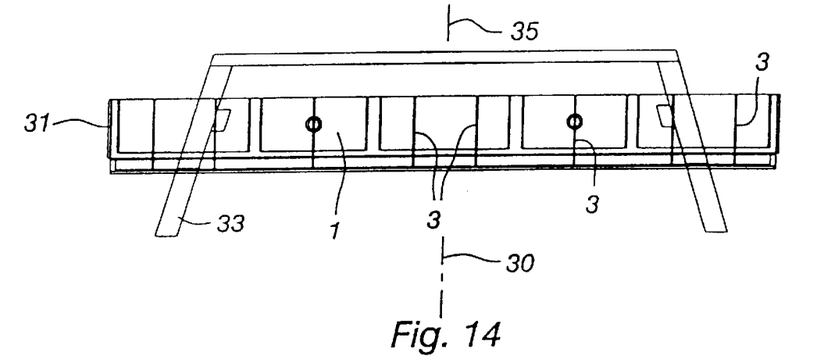
FIG. 14 is a view of one end of the channel of FIG. 13 after the folding has been carried out.
Figure 15:
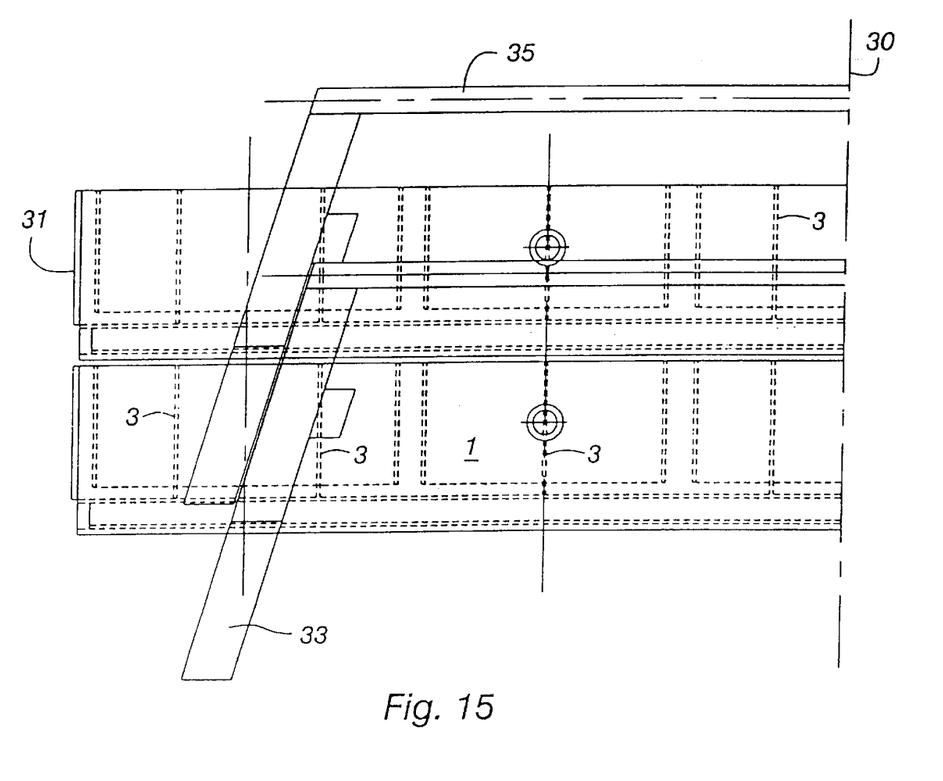
FIG. 15 is an elevation view of a sheet for holding the channels of an external frame of the structure of FIG. 7.

In FIGS. 13 and 14, a variant embodiment of a channel 17 according to the present invention can be seen, which differs from the channel 17 depicted in FIGS. 8 and 9 in that the projecting elements 3 extend from the top edge of the panels 27 so as to adapt to the notches 9' opening out on the top edge of the sheet 15 in FIG. 15. The notches 9' in the sheet 15 of FIG. 15 have the same longitudinal distribution as the openings 9 in the sheet 15 in FIG. 10.

Figure 16:
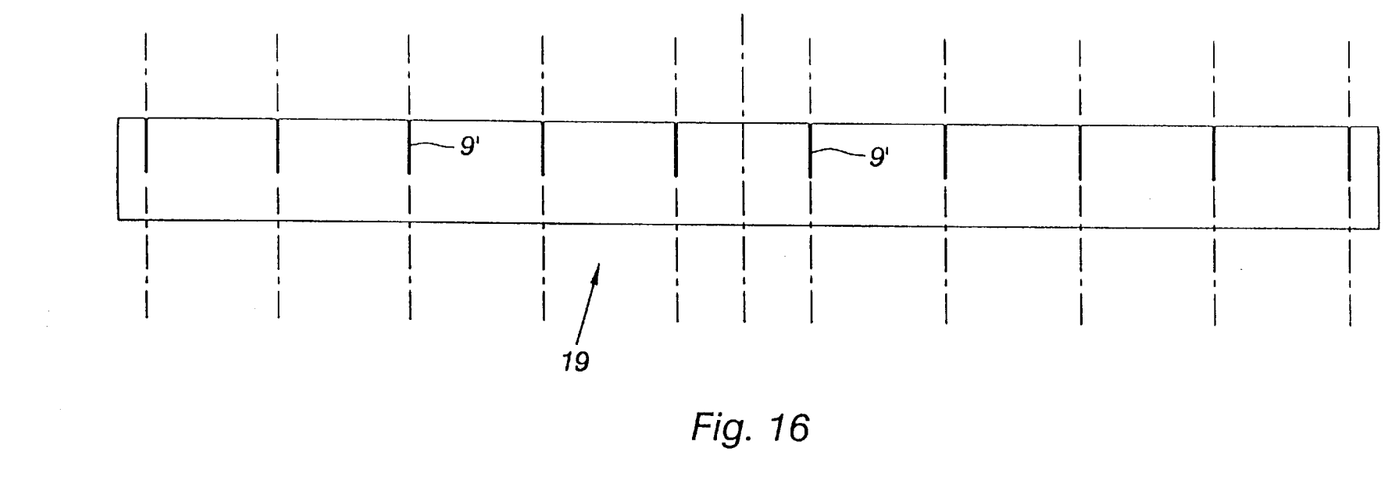
FIG. 16 is an elevation view of a sheet for holding the transverse partitions of a peripheral frame of the structure of FIG. 7.
Figure 17:
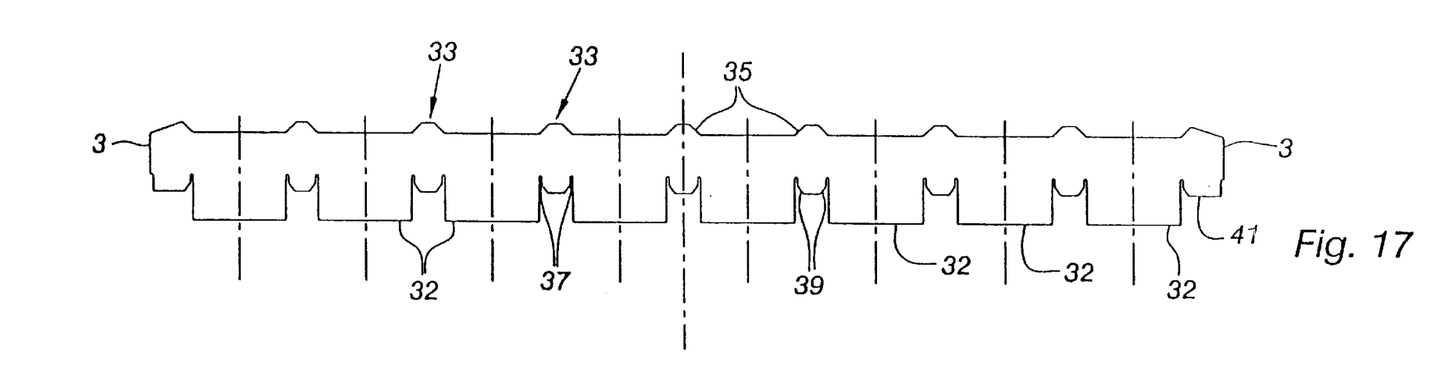
FIG. 17 is a view in elevation of a partition of the structure of FIG. 7.

The sheet 19 in FIG. 16 differs from the sheet 19 in FIG. 11 only in that the openings 9 have been replaced by notches 9' opening out on the top edge of this sheet. Thus it can receive the projecting elements 3 situated in the top part of the ends 41 of the transverse plate 21 in FIG. 17 which, moreover, has the same configuration as the transverse partition 21 in FIG. 12.

Figure 18:
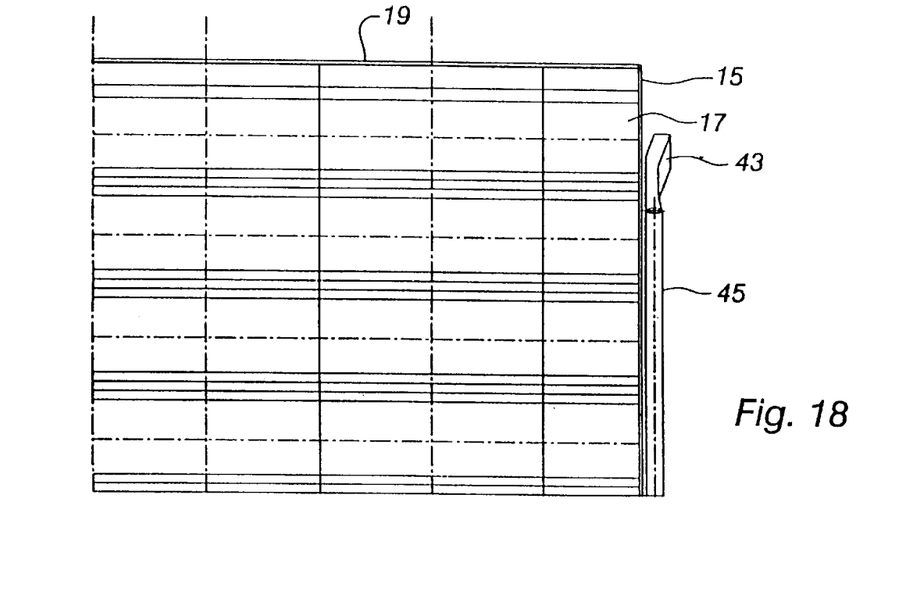
FIG. 18 is a plan view of a quarter of a preferred example embodiment of a rigid structure according to the present invention of the industrial food cooking utensil type.
Figure 19:
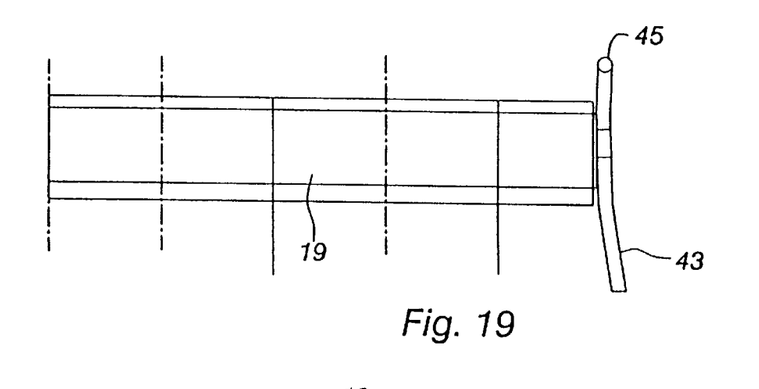
FIG. 19 is a front view of the structure of FIG. 18.
Figure 20:
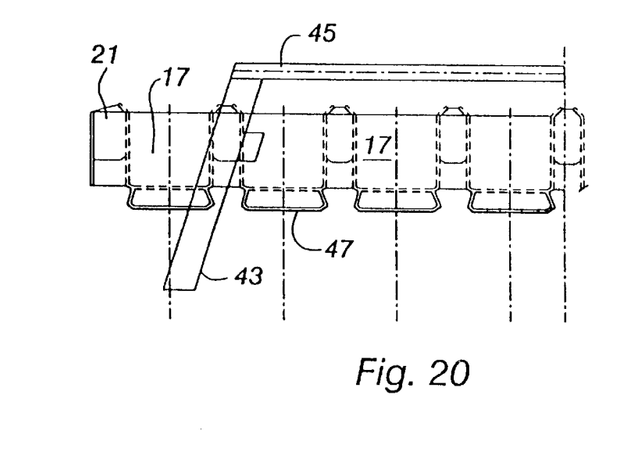
FIG. 20 is a side view of the structure of FIG. 18.

The industrial cooking utensil according to the present invention illustrated in FIGS. 18 to 20 can have other items of equipment such as legs 43 welded to the sheets 15 or 19. Advantageously, each set of legs disposed on one side of the utensil according to the present invention is connected, in its top part in the position of use, by a bar or tube 45 facilitating the handling of the utensil. Advantageously, the legs 43 have a shape splayed downwards, facilitating the centring of the utensils one above the other when they are stacked. The industrial food cooking utensil, notably for hams, according to the present invention, advantageously has under each channel 17 a cover 47 able to adapt to an identical channel disposed immediately below in a stack of stacked cooking utensils according to the present invention. The covers 47 can be welded to the bottoms 25 of the channels 17 or be mounted floating with respect to such a bottom by means of elastic return means.

Naturally the present invention is not limited to cooking utensils having transverse partitions 21 but also extends to ham cooking utensils with no transverse partitions. In FIG. 21, a detail can be seen of such a utensil in which the transverse partitions 21 have been replaced by struts 33' whose shape corresponds to that of the intermediate elements 33 of the transverse partitions 21. Each strut 33' has, directed towards each of the two consecutive channels 17 which it connects, a projecting element 3 extending over the ramp 35 and over a vertical side 36. The length L of the projecting elements 3 is adapted to the thickness e3 of the sheet metal of the channels 17, notably at the level of the notches 31, whilst the thickness e2 of the strut 33' is adapted to the width of the notches 31 in the channels 17. Two notches 31, and consequently two struts 33', are for example distant by a distance greater than or equal to 250 mm.

Advantageously, the channels 17 are disposed parallel to each other at the approximate distance corresponding to their relative positions in an assembled cooking utensil, the struts 33' are inserted and then welding is carried out. Advantageously, the welding is effected solely at the ramps 35. The end sheets 15 are then placed at the two ends of the channels and connection is effected by welding and/or brazing. The welding of the sheets 19 completes the peripheral frames and the fitting of any accessories ends the operation of assembling a structure according to the present invention.

In a variant, the channels 17 are first of all assembled with the end plates 15 and then the struts 33' are inserted.

The method according to the present invention makes it possible to produce rigid structures, notably industrial ham cooking utensils, with a very great precision, for example equal to $\frac{1}{10}^{th}$ of a millimeter in the positioning of the various sheets. Thus all the utensils are practically identical, which facilitates their stacking with perfect adaptation of the covers 47 to the channels 17 placed immediately below.

More and more it is possible to produce larger ham cooking utensils (greater number of channels, greater length of channels) able to be used with cooking cells of adapted dimensions.

In one non-limitative example, the sheets 15 have a thickness of 5 mm, a length of 1260 mm and a height of 105 mm; the sheets 19 have a thickness of 5 mm, a length of 1480 mm and a height of 100 mm; the sheets forming the channel 17 (before folding) have a thickness of 3 mm, a length of 1480 mm, to which there is added on each side 5 mm of the length L of the projecting elements 3, and a width of 356 mm; the transverse partitions 21 have a thickness of 2 mm, a length of 1262 mm, to which there is added on each side 3.5 mm of length of the projecting elements 3, and a maximum height of 117.5 mm.

The present invention applies notably to mechanical construction.

The present invention applies mainly to the food industry such as the cooking of hams.

What is claimed is:

1. A method for assembling a rigid industrial food-cooking container including at least a first sheet (7) and a second sheet (1), comprising:
   (a) conferring the required shape on a first sheet (7) and providing a recess (9, 9', 9", 31) for receiving a projecting element (3) on a second sheet (1) at the required contact location between the said recesses (9, 9', 9", 31) in the first sheet (7) and a projecting element (3) on the said second sheet (1);
   (b) conferring the required shape on a second sheet (1) and providing a projecting element (3) whose geometry is adapted to enter the recess (9, 9', 9", 31) in the first sheet (7), at the required contact location between the projecting element (3) on the second sheet (1) and the recess (9, 9', 9", 31) in the first sheet (7);

(c) providing a temporary connection of the first sheet (7) to the second sheet (1) by nesting the projecting element (3) on the second sheet (1) in the recess (9, 9', 9", 31) in the first sheet (7) characterized in that the two sheets are assembled at right angles;

(d) providing the final connection of the first sheet (7) and of the second sheet (1) by welding or brazing in the same relative positions as those of the sheets (7,1) achieved at step (c), over the contact surface between the end (5) of the second sheets (1, 17, 21) and the first sheets (1, 15, 19) characterized in that the welding or brazing is carried out over the entire contact surface (13) between the end (15) of the second sheets (1, 17, 21) and the first sheets (1, 15, 19) for providing the industrial food-cooking container.

2. A method for assembling a rigid industrial food-cooking container according to claim 1, characterized in that the recess is an opening (9) passing through the first sheet (7) from one side to the other.

3. A method for assembling a rigid industrial food-cooking container according to claim 1, characterized in that the length (L) of the projecting element is less than the thickness (e3) of the first sheet (7).

4. A method for assembling a rigid industrial food-cooking container according to claim 1, characterized in that the second sheet (1) is provided with a projecting element (3) at a first end (5) and with a second projecting element (3) at a second end (5), each of the projecting elements (3) being nested in a recess (9, 9', 9", 31) in two different first sheets (7,7').

5. A method assembling a rigid industrial food-cooking container according to claim 1, characterized in that steps (a) and (b) are performed by cutting on a numeric-control cutting apparatus.

6. A method for assembling a rigid industrial food-cooking container according to claim 1, characterized in that the numeric-control cutting apparatus has a power laser.

7. A method for assembling a rigid industrial food-cooking container according to claim 1, characterized in that the second sheet (1) has a plurality of projecting elements (3), in that step (b) includes a sheet folding operation and in that, at step (a), the recesses (9, 9', 9", 31) are produced in the first sheet (7) corresponding to the position of these projecting elements (3) on the second sheet (1) after folding of this second sheet (1).

8. A method for assembling a rigid industrial food-cooking container according to claim 1, characterized in that the first sheet (7) or the second sheet (1) includes a notch for receiving a transverse sheet (21) having a complementary notch.

9. A method for assembling a rigid industrial food-cooking container according to claim 1, the said structure having a rectangular peripheral frame, characterized in that it includes a step of connecting the sheets (15, 19) of the rectangular peripheral frame with internal sheets (17,21) followed by a subsequent step of welding or brazing the ends of the sheets (15,19) of the said frame.

10. A method for assembling a rigid industrial food-cooking container according to claim 1, characterized in that the welding or brazing for assembling the sheets is a welding by transparency effected from the face of the first sheet (7) opposite to the one receiving the end (5) of the first sheet (7).

11. A structure An industrial food-cooking container produced by the method according to claim 1, characterized in that it includes a least two sheets assembled by welding or brazing, a first sheet having a recess (9, 9', 9", 31) containing a projecting element (3) on the second sheet.

12. An industrial food-cooking container according to claim 11, characterized in that the projecting element (3) is a rectangular parallelepiped.

13. An industrial food-cooking container according to claim 11, characterized in that the projecting element is disposed in line with the second sheet (1).

14. An industrial food-cooking container according to claim 11, characterized in that the said structure is an industrial food cooking utensil.

15. An industrial food-cooking container according to claim 14, characterized in that the said structure is an industrial ham cooking utensil having a plurality of parallel channels (17), each channel being provided at each of its ends (5) with at least one projecting element for connection with an end sheet (15).

16. A method for assembling an industrial food-cooking container including at least a first sheet (7) and a second sheet (1), comprising:

(a) conferring the required shape on a first sheet (7) and providing at least one recess (9, 9', 9", 31) for receiving a projecting element (3) on a second sheet (1) at the required contact location between the said recesses (9, 9', 9", 31) in the first sheet (7) and a projecting element (3) on the said second sheet (1);

(b) conferring the required shape on a second sheet (1) and providing a projecting element (3) whose geometry is adapted to enter the recess (9, 9', 9", 31) in the first sheet (7), at the required contact location between the projecting element (3) on the second sheet (1) and the recess (9, 9', 9", 31) in the first sheet (7);

(c) providing a temporary connection and pre-positioning of the first sheet (7) to the second sheet (1) by nesting the projecting element (3) on the second sheet (1) in the recess (9, 9', 9", 31) in the first sheet (7) to provide a contact surface; and (d) providing a final connection of the first sheet (7) and the second sheet (1) by welding or brazing in the same positions achieved in step (c) over at least a part of the contact surface between the end (5) of the second and first sheets to provide an industrial food-cooking container for cooking the industrial food in the container.

17. The method of claimed 1, wherein the container comprises a receptacle having a shape specific to the industrial food for cooking the industrial in the container.

18. The method of claim 17, wherein the receptacle is formed to contain cooking juices from the cooking of the food.

* * * * *